United States Patent Office 3,707,478
Patented Dec. 26, 1972

3,707,478
5-AROYL-2-($\beta$-R$_3$-ETHYL)-1-LOWERALKYL-
PYRROLES
John Robert Carson, Norristown, Pa., assignor to
McNeil Laboratories, Inc.
No Drawing. Filed June 15, 1970, Ser. No. 46,522
Int. Cl. C07d 27/26
U.S. Cl. 260—326.3                    9 Claims

ABSTRACT OF THE DISCLOSURE

Compounds of the class of 5-aroyl-2-($\beta$-R$_3$-ethyl)-1-loweralkyl-pyrroles useful as anti-inflammatory agents, said R$_3$ being various amino and amido functions.

DESCRIPTION OF THE INVENTION

This invention relates to novel aroyl-substituted pyrroles, and, more particularly, to 5-aroyl-2-($\beta$-R$_3$-ethyl)-1-loweralkyl-pyrroles of the formula:

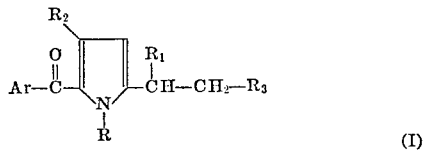

(I)

wherein R is lower alkyl, preferably methyl; R$_1$ and R$_2$ are each a member selected from the group consisting of hydrogen and lower alkyl; R$_3$ is a member selected from the group consisting of amino, loweralkylamino, di-loweralkyl-amino and acetamido; and Ar is a member selected from the group consisting of phenyl and phenyl substituted with one or more members selected from the group consisting of chloro, fluoro, lower alkyl, lower alkoxy and trifluoromethyl. The 5-aroyl-2-($\alpha$-R$_1$-$\beta$-R$_3$-ethyl)-4-R$_2$-1-loweralkyl-pyrroles of Formula I may also be denoted as 5-(1-R$_1$-2-R$_3$-ethyl)-4-R$_2$-1-loweralkyl-pyrrol - 2 - yl aryl ketones (aryl=Ar). The therapeutically active acid addition salts of the Formula I compounds containing a basic nitrogen atom are also included within the scope of this invention.

As used herein, "lower alkyl" and "lower alkoxy" may be straight or branch chained saturated hydrocarbons having from 1 to about 5 carbon atoms, such as, for example, methyl, ethyl, propyl, isoproyl, butyl, pentyl and the like alkyls, and, respectively, the corresponding alkoxys, such as methoxy, ethoxy, propoxy, isopropoxy, etc.

The subject compounds (I) are obtained from the corresponding nitriles having the formula:

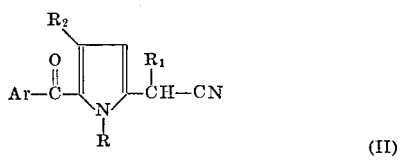

(II)

wherein the symbols R, R$_1$, R$_2$ and Ar are as previously described. Such nitriles of Formula II, wherein R$_2$ is hydrogen, are described in my copending U.S. patent application Ser. No. 5,958, filed Jan. 26, 1970. Those nitriles of Formula II, wherein R$_2$ is lower alkyl, may be prepared from the corresponding 5-aroyl-$\alpha$-R$_1$-1,4-di-loweralkyl-pyrrole-2-acetamides of the formula:

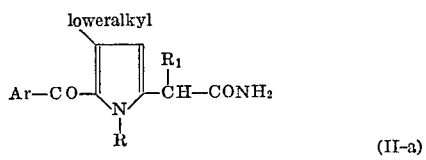

(II-a)

which acetamides are also described in the aforementioned application Ser. No. 5,958. The acetamido function of the Formula II-a compounds is readily transformed into a nitrile function by standard dehydration procedures, such as, for example, by treatment with tosyl chloride in pyridine or with phosphorous oxychloride.

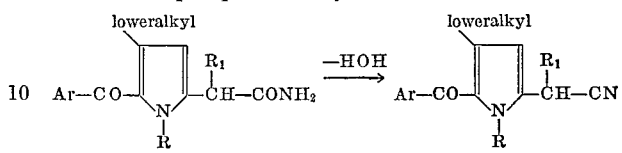

The Formula I compounds, wherein R$_3$ is acetamido, are prepared by the catalytic hydrogenation of the nitriles (II) in the presence of acetic anhydride, the catalyst being a noble metal or, preferably, Raney nickel. Alkaline or acidic hydrolysis of the thus-obtained 5-aroyl-2-($\beta$-acetamido-ethyl)-4-R$_2$-1-loweralkyl-pyrrole (III) affords the corresponding 2-($\beta$-aminoethyl)derivatives (IV). The latter in turn may be transformed into the corresponding 2-($\beta$-dimethylaminoethyl) derivatives (V) of Formula I by methylation of the amino function. Such methylation can be readily accomplished by catalytically hydrogenating a mixture of (IV) with formalin in the presence of sodium acetate and ethanol. The 2-($\beta$-aminoethyl) derivatives (IV) may also be prepared directly from the nitriles (II) by catalytic reduction techniques, for example, by treating (II) with hydrogen and Raney nickel catalyst in a lower alkanol, preferably absolute alcohol, in the presence of ammonia. Substitution of a loweralkylamine or a di-loweralkyl-amine for ammonia affords the corresponding compounds of Formula I wherein R$_3$ is loweralkyl-amino or di-loweralkyl-amino, respectively (VI). The foregoing reactions may be illustrated by the following diagrammatic sequence:

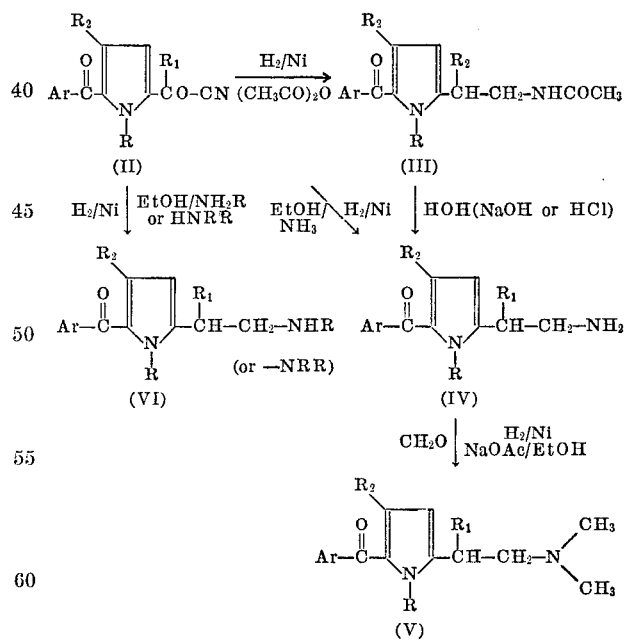

The subject compounds (I) possess anti-inflammatory activity as demonstrated in the standard kaolin-induced rat paw edema test or cotton pellet granuloma test (both tests are described in the previously mentioned application Ser. No. 5,958) at doses generally ranging from about 5 to about 100 mg./kg. body weight. For example, with 2-($\beta$-acetamidoethyl-5-(p-chlorobenzoyl)-1-methylpyrrole, 2-aminoethyl-5-(p-toluoyl)-1-methylpyrrole hydrochloride and 2-($\beta$-dimethylaminoethyl)-5-p-toluoyl-1- methylpyrrole hydrochloride, an inhibition of 22%, 75% and 32%, respectively, is observed in the kaolin-induced rat paw edema assay at respective dosages of 50, 25 and 25 mg./kg. body weight.

Due to the available α-carbon atom (when $R_1$ equals lower alkyl) present in the subject compounds (I), it is evident that their existence in the form of stereochemical isomers (enantiomorphs) is possible. Thus by standard methods of resolution the corresponding (−) or (+) forms of the desired compounds will be obtained. Such pharmacologically active enantiomorphs are naturally intended to be included within the scope of this invention.

The therapeutically active non-toxic acid addition salts of the basic nitrogen-containing compounds of Formula I are prepared by treatment with an appropriate acid such as an inorganic acid, e.g., hydrochloric, hydrobromic, hydriodic, sulfuric, nitric and the like acids; or an organic acid such as acetic, propionic, glycolic, lactic, pyruvic, malonic, maleic, malic, succinic, fumaric, tataric, citric, benzoic, cinnamic, methane sulfonic, salicyclic and the like acids.

The following examples are intended to illustrate, but not to limit, the scope of the present invention.

Example I

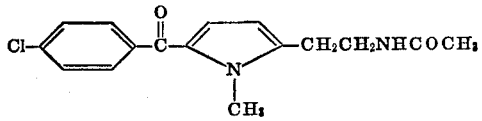

2 - (β - acetamidoethyl) - 5 - (p - chlorobenzoyl) - 1-methylpyrrole.—A solution of 5.5 g. (0.02 mole) 5-p-chlorobenzoyl) - 1 - methylpyrrole - 2 - acetonitrile and 75 ml. of acetic anhydride is hydrogenated in a Parr shaker over Raney nickel catalyst. An initial pressure of thirty pounds per square inch of hydrogen is employed. The catalyst is filtered off. The solvent is evaporated resulting in about 3.8 g. of a yellow solid, 2-(β-acetamidoethyl)-5-(p-chlorobenzoyl)-1-methylpyrrole, which is purified by recrystallizing twice in ethyl acetate; M.P. 166–168° C.

Analysis.—Calcd. for $C_{16}H_{17}ClN_2O_2$ (percent): C, 63.05; H, 5.62; N, 9.19. Found (percent): C, 62.86; H, 5.63; N, 9.03.

Example II 2-(β-acetamidoethyl) - 5 - (p-toluoyl) - 1 - methylpyrrole.—A solution of 8.4 g. (0.035 mole) of 1-methyl-5-p-toluoyl pyrrole-2-acetonitrile in approximately 100 ml. acetic anhydride is hydrogenated under 40 p.s.i. hydrogen in a Parr shaker for 18 hours over Raney nickel as the catalyst. The catalyst is then removed by filtration. The filtrate is evaporated and the resultant white solid, 2-(β-acetamidoethyl)-5-(p-toluoyl)-1-metyhlpyrrole, is purified by recrystallization in ethyl acetate; M.P. 156–159° C.

Example III

The procedure of Example II may be followed to prepare the 2-(α-$R_1$-β-acetamido-ethyl) derivatives of Formula I by using the appropriate nitrile precursor (II). For example, by substituting an equivalent quantity of the following nitriles:

5-benzoyl-1-methylpyrrole-2-acetonitrile,
5-(2′,4′-dichlorobenzoyl)-1-methylpyrrole-2-acetonitrile,
5-(3′-chloro-p-toluoyl)-1-methylpyrrole-2-acetonitrile,
5-(p-trifluoromethylbenzoyl)-1-methylpyrrole-2-acetonitrile,
5-(p-methoxybenzoyl)-1-ethylpyrrole-2-acetonitrile,
5-benzoyl-1-ethyl-α-methylpyrrole-2-acetonitrile, and
5-(p-toluoyl)-α-ethyl-1-methylpyrrole-2-acetonitrile, for the nitrile precursor used in Example II, the following pyrroles of Formula I are obtained as respective products:

2-(β-acetamidoethyl)-5-benzoyl-1-methylpyrrole,
2-(β-acetamidoethyl)-5-(2′,4′-dichlorobenzoyl)-1-methylpyrrole,
2-(β-acetamidoethyl)-5-(3′-chloro-p-toluoyl)-1-methylpyrrole,
2-(β-acetamidoethyl)-5-(p-trifluoromethylbenzoyl)-1-methylpyrrole,
2-(β-acetamidoethyl)-5-(p-methoxybenzoyl)-1-ethylpyrrole,
2-(β-acetamidoethyl)-5-benzoyl-1-ethyl-α-methylpyrrole, and
2-(β-acetamidoethyl)-5-(p-toluoyl)-α-ethyl-1-methylpyrrole.

Example IV 2-aminoethyl-5-(p-toluoyl)-1-methylpyrrole and its hydrochloride salt.—A slurry of 11.9 g.) 0.05 mole) of 1-methyl-5-(p-toluoyl)-pyrrole-2-acetonitrile in 400 ml. absolute ethanol is cooled to 0° C. with an ice-bath. Ammonia gas is bubbled through vigorously for fifteen minutes. Raney Active Nickel Catalyst No .28 (W. R. Grace & Co.) is washed three times with ethanol and introduced to the above suspension. The mixture is placed under 38 p.s.i. hydrogen and hydrogenated for 18 hours in a Parr shaker. The catalyst is then removed by filtration and the filtrate is evaporated to yield 2-aminoethyl-5-(p-toluoyl)-1-methylpyrrole as an off-white solid, M.P. 57.5–60.5° C.

The hydrochloride salt is made by dissolving the amine base in isopropanol and treating the solution with ethereal hydrogen chloride. The resultant precipitate is separated by filtration; M.P. 217–218° C.

The hydrochloride is also prepared by treating an aqueous solution of the amine base with concentrated hydrochloric acid. It is separated by filtration and purified by recrystallization in isopropanol; M.P. 218–220° C.

Analysis.—Calcd. for $C_{15}H_{19}ClNO$ (percent): C, 64.62; H, 6.86; N, 10.04. Found (percent): C, 64.61; H, 6.98; N, 10.02.

Example V

The procedure of Example IV may be followed to prepare the 2-(α-$R_1$-β-amino-ethyl) derivatives of Formula I by using the appropriate nitrile precursor (II). For example, by substituting an equivalent quantity of the following nitriles:

5-(p-fluorobenzoyl)-1-methylpyrrole-2-acetonitrile,
5-(p-ethylbenzoyl)-1-methylpyrrole-2-acetonitrile,
5-(3′,4′-dimethylbenzoyl)-1-methylpyrrole-2-acetonitrile,
5-(p-chlorobenzoyl)-1,α-dimethylpyrrole-2-acetonitrile,
5-(p-methylbenzoyl)-α-ethyl-1-methylpyrrole-2-acetonitrile,
5-benzoyl-1-ethylpyrrole-2-acetonitrile,
5-(p-methoxybenzoyl)-1-ethylpyrrole-2-acetonitrile,
5-(p-fluorobenzoyl)-α-ethyl-1-methylpyrrole-2-acetonitrile,
5-(p-trifluoromethylbenzoyl)-1-methylpyrrole-2-acetonitrile, and
5-(2′,4′-dichlorobenzoyl)-1-n-butyl-α-methyl-pyrrole-2-acetonitrile, for the nitrile precursor used in Example I, the following pyrroles of Formula I and hydrochloride salt thereof are obtained as respective products:

2-aminoethyl-5-(p-fluorobenzoyl)-1-methylpyrrole,
2-aminoethyl-5-(p-ethylbenzoyl)-1-methylpyrrole,
2-aminoethyl-5-(3′,4′-dimethylbenzoyl)-1-methylpyrrole,
2-aminoethyl-5-(p-chlorobenzoyl)-1,α-dimethylpyrrole,
2-aminoethyl-5-(p-methylbenzoyl)-α-ethyl-1-methylpyrrole,
2-aminoethyl-5-benzoyl-1-ethylpyrrole,
2-aminoethyl-5-(p-methoxybenzoyl)-1-ethylpyrrole,
2-aminoethyl-5-(p-fluorobenzoyl)-α-ethyl-1-methylpyrrole,
2-aminoethyl-5-(p-trifluoromethylbenzoyl)-1-methylpyrrole, and
2-aminoethyl-5-(2′,4′-dichlorobenzoyl)-1-n-butyl-α-methylpyrrole.

Example VI

5 - (2-dimethylaminoethyl)-1-methylpyrrol-2-yl p-tolyl ketone and its hydrochloride salt.—A solution of 4.0 g. (0.0165 mole) 5-(2-aminoethyl)-1-methylpyrrol-2-yl p-tolyl ketone in 20 ml. 95% ethanol is treated with 2.7 ml. (0.033 mole) 37% formalin. Sodium acetate (0.165 g.) and Raney nickel catalyst are added and the mixture is hydrogenated in a Parr Shaker for eighteen hours under 40 p.s.i. hydrogen. The catalyst is then removed by filtration and the filtrate evaporated. The residue, 5-(2 dimethylaminoethyl)-1-methylpyrrol-2-yl p-tolyl ketone, is dissolved in ethanol and converted to the hydrochloride salt by treatment with ethereal hydrogen chloride. The white precipitate, 5-(2-dimethylaminoethyl)-1-methylpyrrol-2-yl p-tolyl ketone hydrochloride, is separated by filtration and purified by recrystallization in 2-propanol, M.P. 225–227° C.

Example VII

The methylation procedure of Example VI may be followed to prepare the 2-($\alpha$-$R_1$-$\beta$-dimethylamino-ethyl) derivatives of Formula I by using the appropriate corresponding 2-($\alpha$-$R_1$-$\beta$-amino-ethyl) precursor. For example, by substituting an equivalent quantity of each of the products obtained in Example V for the 5-(2-aminoethyl)-1-methylpyrrol-2-yl p-tolyl ketone employed in Example VI, the following pyrroles of Formula I and hydrochloride salt thereof are obtained as respective products:

2-dimethylaminoethyl-5-(p-fluorobenzoyl)-1-methylpyrrole,
2-dimethylaminoethyl-5-(p-ethylbenzoyl)-1-methylpyrrole,
2-dimethylaminoethyl-5-(3′,4′-dimethylbenzoyl)-1-methylpyrrole,
2-dimethylaminoethyl-5-(p-chlorobenzoyl)-1-$\alpha$-dimethylpyrrole,
2-dimethylaminoethyl-5-(p-methylbenzoyl)-$\alpha$-ethyl-1-methylpyrrole,
2-dimethylaminoethyl-5-benzoyl-1-ethylpyrrole,
2-dimethylaminoethyl-5-(p-methoxybenzoyl)-1-ethylpyrrole,
2-dimethylaminoethyl-5-(p-fluorobenzoyl)-$\alpha$-ethyl-1-methylpyrrole,
2-dimethylaminoethyl-5-(p-trifluoromethylbenzoyl)-1-methylpyrrole, and
2-dimethylaminoethyl-5-(2′,4′-dichlorobenzoyl)-1-n-butyl-$\alpha$-methylpyrrole.

Example VIII 5-(p-chlorobenzoyl)-1,4-dimethylpyrrole - 2 - acetonitrile.—A 2.09 g. sample of p-toluene-sulfonyl chloride (0.011 mole) is added to a suspension of 2.90 g. (0.01 mole) of 5-(p-chlorobenzoyl)-1,4-dimethylpyrrole-2-acetamide in 10 ml. of pyridine. The mixture is stirred for two hours and poured into water. The mixture is extracted with ether. The ether extract is washed with dilute HCl and brine and dried ($MgSO_4$). The solvent is evaporated in vacuo and the residue is recrystallized from 2-propanol to give 5-(p-chlorobenzoyl)-1,4-dimethylpyrrole-2-acetonitrile as a crystalline solid.

Example IX (A) By repeating the procedures of Examples II and IV, except that an equivalent quantity of 5-(p-chlorobenzoyl)-1,4-dimethylpyrrole-2-acetonitrile is employed as the starting nirtile, there are obtained as respective products: 2-($\beta$-acetamidoethyl)-5-(p-chlorobenzoyl)-1,4-dimethylpyrrole and 2-aminoethyl-5-(p-chlorobenzoyl)-1,4-dimethylpyrrole, including the hydrochloride salt of the latter.

(B) By substituting an equivalent quantity of 2-aminoethyl-5-(p-chlorobenzoyl) - 1,4 - dimethylpyrrole in the methylation procedure of Example VI, the corresponding 2-($\beta$-dimethylaminoethyl) - 5 - (p-chlorobenzoyl)-1,4-dimethylpyrrole and its hydrochloride salt are obtained.

Example X

The procedure of Example VIII may be followed to transform the acetamido function of the Formula II-a compounds into the nitrile function of the corresponding Formula II compounds. For example, the following respective nitriles of Formula II are obtained by substituting an equivalent amount of the appropriate 5-aroyl-$\alpha$-$R_1$-1,4-di-loweralkylpyrrole-2-acetamide as the starting material in the procedure of Example VIII:

5-(p-toluoyl)-1,4-dimethylpyrrole-2-acetonitrile;
5-(3′,4′-dimethoxybenzoyl)-1,4-dimethylpyrrole-2-acetonitrile;
5-(p-trifluoromethylbenzoyl)-1,4-dimethylpyrrole-2-acetonitrile;
5-(p-chlorobenzoyl)-4-ethyl-1-methylpyrrole-2-acetonitrile;
5-(p-chlorobenzoyl)-1,4,$\alpha$-trimethylpyrrole-2-acetonitrile;
5-benzoyl-1,4,$\alpha$-trimethylpyrrole-2-acetonitrile;
5-(p-ethoxybenzoyl)-1,4,$\alpha$-trimethylpyrrole-2-acetonitrile;
5-(2′,4′-dimethoxybenzoyl)-1,4,$\alpha$-trimethylpyrrole-2-acetonitrile;
5-(p-chlorobenzoyl)-4-ethyl-1,$\alpha$-dimethylpyrrole-2-acetonitrile; and
5-(p-chlorobenzoyl)-1,4-dimethyl-$\alpha$-n-propylpyrrole-2-acetonitrile.

Example XI (A) By repeating the procedures of Examples II and IV, except that an equivalent quantity of each of the Formula II nitriles obtained in Example X are employed as the starting nitrile, there are obtained, as respective products, the corresponding 2-($\beta$-acetamidoethyl) and 2-aminoethyl derivatives of Formula I, including the hydrochloride salts of such 2-aminoethyl derivatives.

(B) By substituting an equivalent quantity of each of the 2-aminoethyl derivatives obtained in Example XI-A in the methylation procedure of Example VI, the corresponding 2-($\beta$-dimethylaminoethyl) derivatives of Formula I and the hydrochloride salt thereof are obtained.

I claim:

1. A member selected from the group consisting of a 5-aroyl-2-($\alpha$-$R_1$-$\beta$-$R_3$-ethyl)-4-$R_2$-1-loweralkyl-pyrrole of the formula:

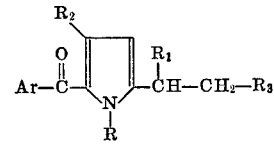

wherein R is lower alkyl, $R_1$ and $R_2$ are each a member selected from the group consisting of phenyl and phenyl alkyl; $R_3$ is a member selected from the group consisting of amino, di-loweralkyl-amino and acetamido; and Ar is a member selected from the group consisting of phenyl and phenyl substituted with one or two members selected from the group consisting of chloro, fluoro, lower alkyl, lower alkoxy and trifluoromethyl; and the therapeutically active acid addition salts of the foregoing pyrroles containing a basic nitrogen, said "lower" being from 1 to 5 carbon atoms.

2. A member selected from the group consisting of a 5-aroyl-2-($\alpha$-$R_1$-$\beta$-$R_3$-ethyl)-1-methylpyrrole of the formula:

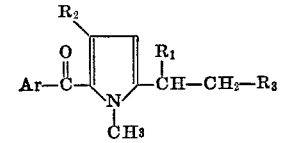

wherein $R_1$ and $R_2$ are each a member selected from the group consisting of hydrogen and lower alkyl; $R_3$ is a member selected from the group consisting of amino, diloweralkyl-amino and acetamido; and Ar is a member selected from the group consisting of phenyl and phenyl substituted with one or two members selected from the group consisting of chloro, fluoro, lower alkyl, lower alkoxy and trifluoromethyl; and the therapeutically active acid addition salts of the foregoing pyrroles containing a basic nitrogen, said "lower" being from 1 to 5 carbon atoms.

3. 2 - (β-acetamidoethyl)-5-(p-chlorobenzoyl)-1-methylpyrrole.

4. 2-(β-acetamidoethyl)-5-(p-toluoyl)-1-methylpyrrole.

5. A member selected from the group conssiting of 2-aminoethyl-5-(p-toluoyl)-1-methylpyrrole and its hydrochloride salt.

6. A member selected from the group consisting of 2-(β - dimethylaminoethyl)-5-(p-toluoyl)-1-methylpyrrole and its hydrochloride salt.

7. 2-(β-acetamidoethyl)-5-(p-chlorobenzoyl) - 1,4 - dimethylpyrrole.

8. A member selected from the group consisting of 2-aminoethyl-5-(p-chlorobenzoyl) - 1,4 - dimethylpyrrole and its hydrochloride salt.

9. A member selected from the group consisting of 2-(β-dimethylaminoethyl) - 5 - (p-chlorobenzoyl)-1,4-dimethylpyrrole and its hydrochloride salt.

References Cited
UNITED STATES PATENTS 3,591,602    7/1971    Lockhart _____ 260—326.3

ALTON D. ROLLINS, Primary Examiner

J. A. NARCAVAGE, Assistant Examiner

U.S. Cl. X.R.

260—326.5 J; 424—274